(12) United States Patent
Yoon et al.

(10) Patent No.: US 11,328,868 B2
(45) Date of Patent: May 10, 2022

(54) DIELECTRIC CERAMIC COMPOSITION AND MULTI-LAYER CERAMIC ELECTRONIC COMPONENT USING THE SAME

(71) Applicant: SAMSUNG ELECTRO-MECHANICS CO., LTD., Suwon-si (KR)

(72) Inventors: Seok Hyun Yoon, Suwon-si (KR); Mi Yang Kim, Suwon-si (KR); Jin Woo Kim, Suwon-si (KR); Dong Hun Kim, Suwon-si (KR); Jung Deok Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 127 days.

(21) Appl. No.: 16/574,618

(22) Filed: Sep. 18, 2019

(65) Prior Publication Data
US 2020/0381179 A1    Dec. 3, 2020

(30) Foreign Application Priority Data

May 31, 2019 (KR) .......................... 10-2019-0064764

(51) Int. Cl.
*C04B 35/468* (2006.01)
*H01G 4/12* (2006.01)
(Continued)

(52) U.S. Cl.
CPC ........... *H01G 4/1227* (2013.01); *C04B 35/14* (2013.01); *C04B 35/2633* (2013.01);
(Continued)

(58) Field of Classification Search
CPC .......................... H01G 4/1227; C04B 35/2633; C04B 35/468; C04B 2235/785; C04B 2235/761
See application file for complete search history.

(56) References Cited

U.S. PATENT DOCUMENTS

| | | | | |
|---|---|---|---|---|
| 5,335,139 A | * | 8/1994 | Nomura | ............... H01G 4/1227 361/321.4 |
| 5,668,694 A | * | 9/1997 | Sato | ........................ B32B 18/00 257/295 |

(Continued)

FOREIGN PATENT DOCUMENTS

| | | |
|---|---|---|
| JP | H08-124785 A | 5/1996 |
| JP | H11-273985 A | 10/1999 |

(Continued)

OTHER PUBLICATIONS

Seok-Hyun Yoon et al., "Difference between compositional and grain size effect on the dielectric nonlinearity of Mn and V-doped BaTiO3 multilayer ceramic capacitors", Journal of Applied Physics 115, 244101 (2014).

*Primary Examiner* — Noah S Wiese
(74) *Attorney, Agent, or Firm* — Morgan, Lewis & Bockius LLP

(57) ABSTRACT

A dielectric ceramic composition and a multilayer ceramic electronic component are provided, the dielectric ceramic composition includes a barium titanate base material main component and a subcomponent, a microstructure after sintering includes a first crystal grain including 3 or less domain boundaries and a second crystal grain including 4 or more domain boundaries, and an area ratio of the second crystal grain to the total crystal grains is 20% or less.

20 Claims, 11 Drawing Sheets

(51) Int. Cl.
*C04B 35/26* (2006.01)
*C04B 35/14* (2006.01)
*C04B 35/48* (2006.01)

(52) U.S. Cl.
CPC ............ *C04B 35/468* (2013.01); *C04B 35/48* (2013.01); *C04B 2235/404* (2013.01); *C04B 2235/407* (2013.01)

(56) References Cited

U.S. PATENT DOCUMENTS

| | | | |
|---|---|---|---|
| 6,185,087 B1 * | 2/2001 | Park | H01G 4/1227 |
| | | | 361/321.4 |
| 6,303,529 B1 | 10/2001 | Wada et al. | |
| 6,310,761 B1 * | 10/2001 | Hori | C04B 35/4682 |
| | | | 361/321.2 |
| 6,614,644 B2 * | 9/2003 | Chazono | H01G 4/1209 |
| | | | 361/312 |
| 6,746,980 B2 * | 6/2004 | Tokita | C04B 35/4682 |
| | | | 501/137 |
| 8,097,552 B2 * | 1/2012 | Yamaguchi | C04B 35/4682 |
| | | | 501/139 |
| 9,266,781 B2 * | 2/2016 | Wang | B82Y 30/00 |
| 2008/0266751 A1 | 10/2008 | Yamazaki et al. | |
| 2015/0062774 A1 | 3/2015 | Yoon et al. | |

FOREIGN PATENT DOCUMENTS

| | | |
|---|---|---|
| JP | 2007-153636 A | 6/2007 |
| JP | WO2007/074731 A1 | 7/2007 |
| KR | 10-2015-0028057 A | 3/2015 |

\* cited by examiner

I-I'

DIELECTRIC CERAMIC COMPOSITION AND MULTI-LAYER CERAMIC ELECTRONIC COMPONENT USING THE SAME

CROSS-REFERENCE TO RELATED APPLICATION(S)

This application claims benefit of priority to Korean Patent Application No. 10-2019-0064764 filed on May 31, 2019 in the Korean Intellectual Property Office, the disclosure of which is incorporated herein by reference in its entirety.

BACKGROUND

1. Field

The present disclosure relates to a dielectric ceramic composition and a multilayer ceramic electronic component including the same.

2. DESCRIPTION OF RELATED ART

In general, an electronic component using a ceramic material such as a capacitor, an inductor, a piezoelectric element, a varistor, a thermistor, or the like, includes a ceramic body formed of a ceramic material, an internal electrode formed in a body, and an external electrode installed on a surface of the ceramic body to be connected to the internal electrode.

In recent years, due to the trend for the miniaturization and multifunctionalization of electronic products, chip components have led to the tendency of miniaturization and high functionality. Therefore, a multilayer ceramic capacitor is required to be a high-capacity product having a small size and high capacity.

For example, as a method for achieving both miniaturization and high capacity in a multilayer ceramic capacitor, a thickness of a dielectric layer and an electrode layer therein is reduced to allow a larger number of layers to be stacked. In this regard, a thickness of a recent dielectric layer is on a level of about 0.7 μm, and the development is proceeding to continuously thinner levels.

As described above, according to the miniaturization of the multilayer ceramic capacitor, there may be problems in reduction in dc-bias characteristics as well as reliability of a product and high-temperature withstand voltage characteristics. The dc-bias characteristics refer to a phenomenon in which a capacity or a dielectric constant is reduced, by increasing the size of a dc-bias field applied to the product.

For example, as an application example such as a power management integrated circuit, or the like, products are often used while a dc-bias is applied. Here, under the conditions in which a high electric dc-bias is applied, the demand for characteristics in which a high effective dielectric constant or capacity is implemented is increased.

SUMMARY

An aspect of the present disclosure is to provide a dielectric ceramic composition, in which a dc bias dielectric constant is excellent, and a multilayer ceramic electronic component.

Another aspect of the present disclosure is to provide a dielectric ceramic composition, in which high-temperature withstand voltage characteristics are excellent, and a multilayer ceramic electronic component.

Another aspect of the present disclosure is to provide a dielectric ceramic composition, capable of being sintered in a reducing atmosphere, and a multilayer ceramic electronic component.

Another aspect of the present disclosure is to provide a dielectric ceramic composition, in which characteristics of less than ±15% are provided at temperature coefficient of capacitance (TCC) (85° C.) or TCC (125° C.), and a multilayer ceramic electronic component.

According to an aspect of the present disclosure, a dielectric ceramic composition includes a barium titanate base material main component and a subcomponent, a microstructure after sintering includes a first crystal grain including 3 or less domain boundaries and a second crystal grain including 4 or more domain boundaries, and an area ratio of the second crystal grain to the total crystal grains is 20% or less.

According to another aspect of the present disclosure, a multilayer ceramic electronic component includes a ceramic body including a dielectric layer and an internal electrode; and an external electrode formed on an external surface of the ceramic body, and electrically connected to the internal electrode, a microstructure of the dielectric layer includes a first crystal grain including 3 or less domain boundaries and a second crystal grain including 4 or more domain boundaries, and an area ratio of the second crystal grain to the total crystal grains is 20% or less.

Other features and aspects will be apparent from the following detailed description, the drawings, and the claims.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
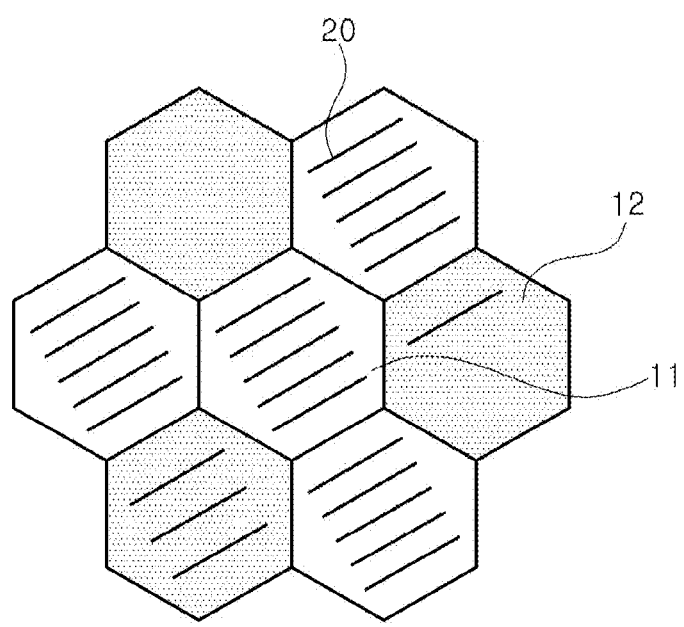
FIG. 1 is a schematic view illustrating a microstructure after sintering according to an example embodiment.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element (s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

The present invention relates to a dielectric ceramic composition, and an electronic component, including a dielectric ceramic composition, may be capacitors, inductors, piezoelectric elements, varistors, thermistors, or the like, by way of example.

A dielectric ceramic composition according to an embodiment of the present disclosure includes a barium titanate base material main component and a subcomponent, a microstructure after sintering of the dielectric ceramic composition includes a first crystal grain including 3 or less domain boundaries and a second crystal grain including 4 or more domain boundaries, and an area ratio of the second crystal grain to the total crystal grains is 20% or less.

The area ratio of the second crystal grain may be 20% or less, 19% or less, 18% or less, 17% or less, 16% or less, 15% or less, 14% or less, 13% or less, 12% or less, 11% or less, or 10% or less, and a lower limit thereof is not particularly limited, but may be 0% or more, or more than 0%, by way of example.

The area ratio of the crystal grain may be confirmed by image analysis of a cross section of a dielectric layer after sintering. For example, a dielectric ceramic composition according to the present disclosure is sintered, and a cross section thereof is exposed. Then, different positions of the cross section were captured for 10 images having an area of $2 \times 2$ $\mu m^2$ using SEM or TEM. In addition, crystal grains in the captured images were analyzed in a unit of pixel using the image analysis software (US National Institutes of Health (NIH) open source, "Image J" or "MATLAB" by MathWorks). Thus, areas of the first crystal grain and the second crystal grain were analyzed using the above procedure.

In this specification, a "main component" may refer to a component occupying a relatively high weight ratio relative to other components, or may refer to a component greater than or equal to 50 wt % based on the weight of the entire composition or the entire dielectric layer. Moreover, a "subcomponent" may refer to a component occupying a relatively low weight ratio relative to other components, or may refer to a component less than 50 wt % based on the weight of the entire composition or the entire dielectric layer.

According to the related art, characteristics of a high dielectric constant are required for a dielectric. Thus, studies have been conducted to improve the crystallinity of the dielectric composition forming the dielectric. In contrast, the present inventors have found that a high electric dc-bias dielectric constant is changed according to the number of domain boundaries inside a crystal grain generated after sintering and/or tetragonality (=c/a).

Figure 4:
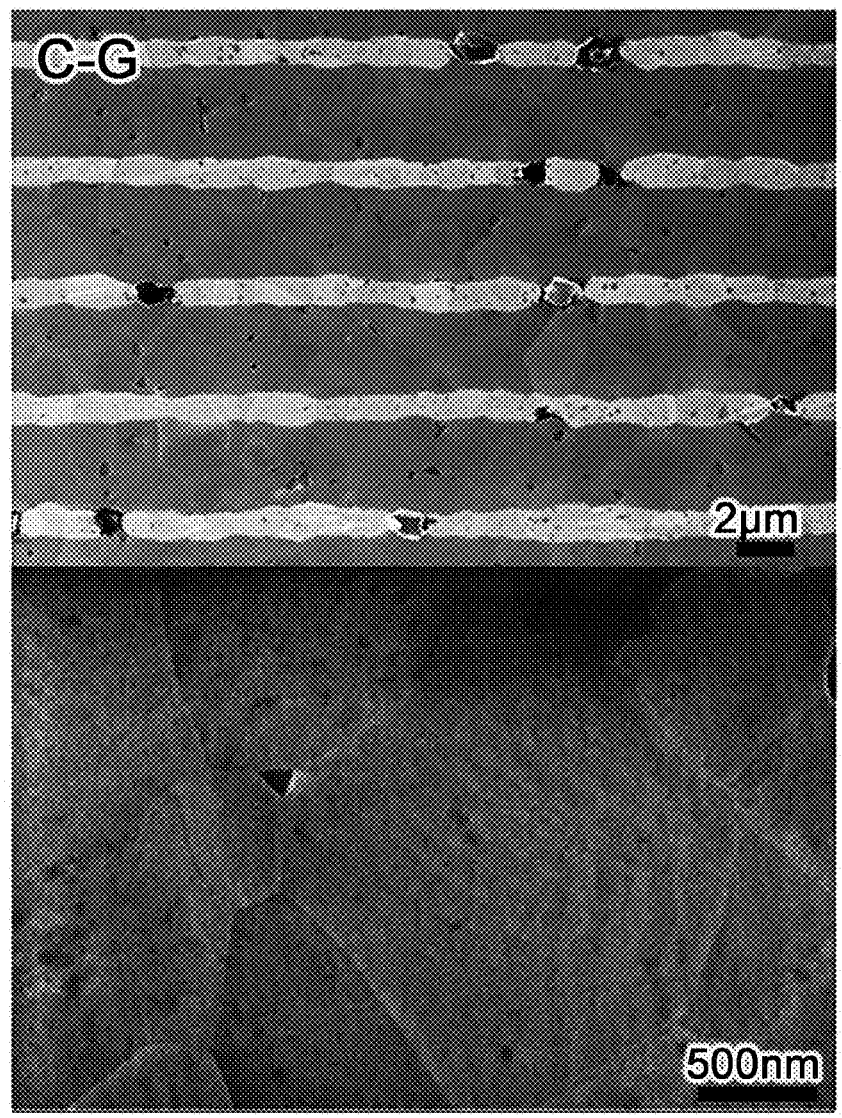
FIGS. 4 to 6 are scanning electron microscope (SEM) analysis images of a prototype sample according to an embodiment.
Figure 5:
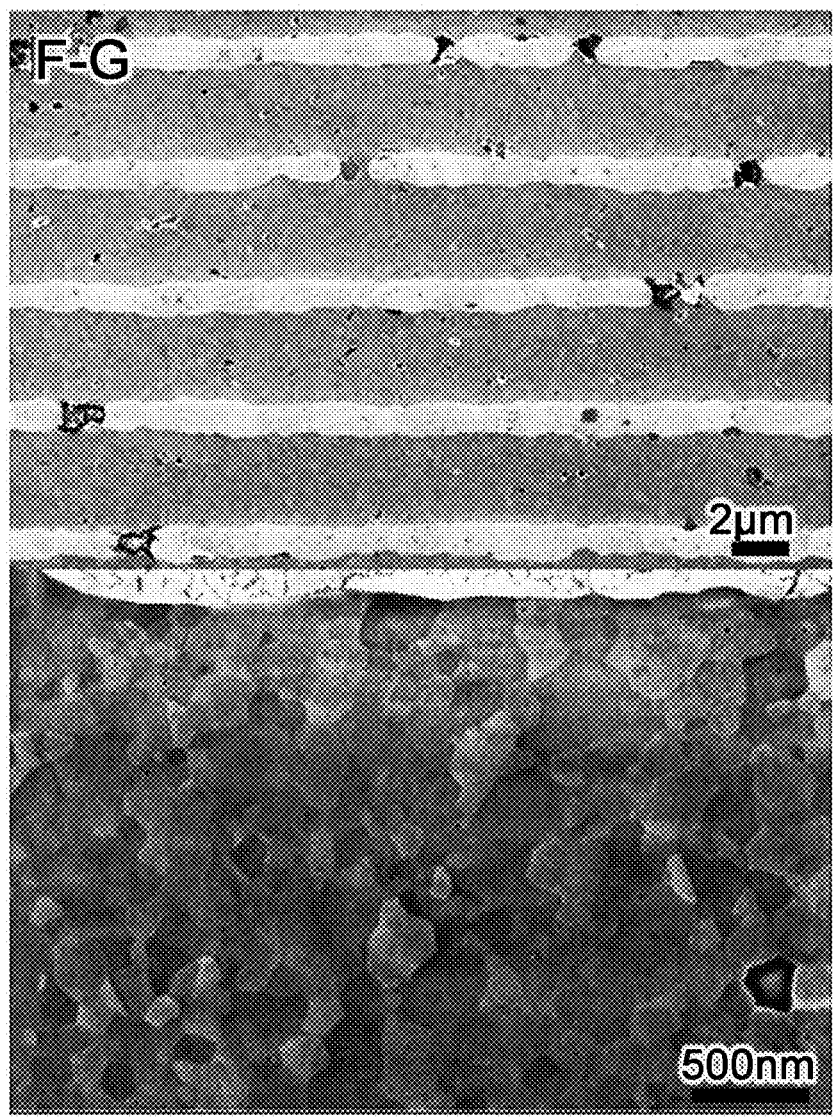
Figure 6:
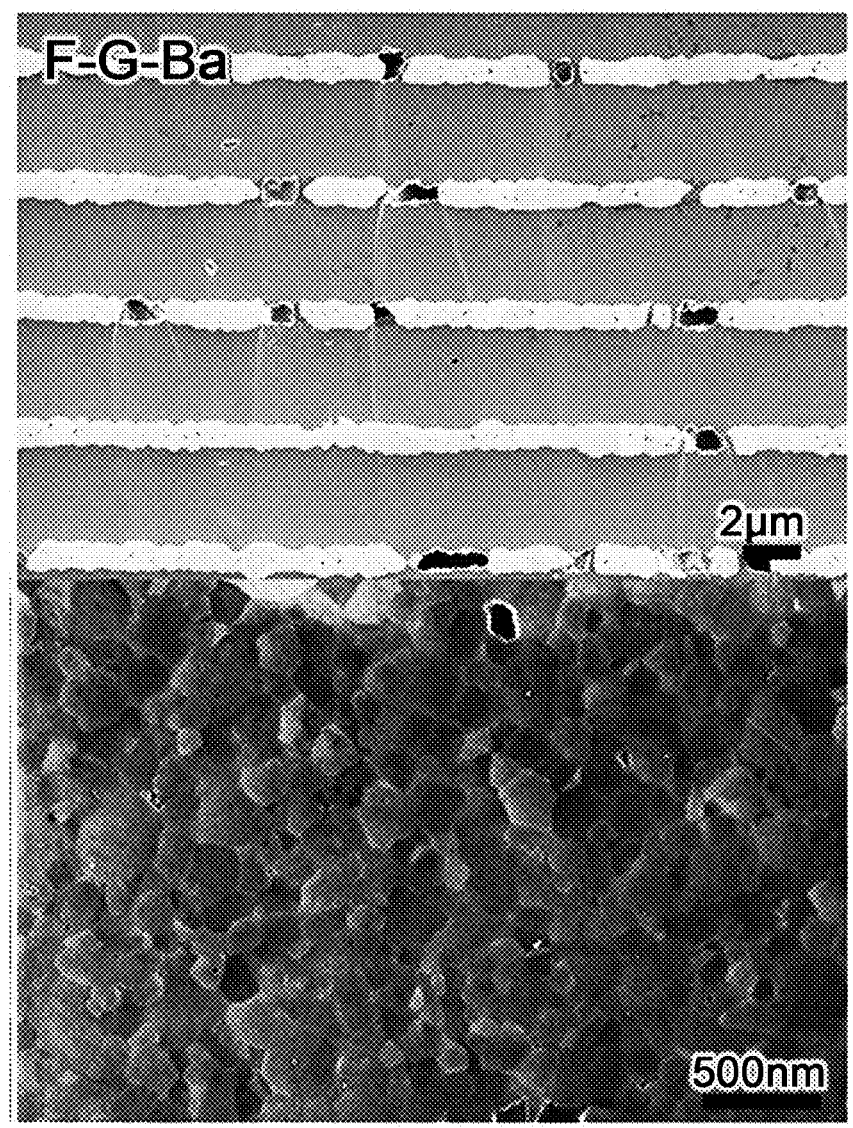

To confirm the relationship between the number of domain boundaries inside a crystal grain and/or tetragonality (=c/a) and a high electric field dc-bias dielectric constant, three types of prototype multilayer ceramic capacitor (MLCC) samples were prepared and tested. FIGS. 4 to 6 illustrate microstructures of C-G (coarse grained), F-G (fine grained), and F-G-Ba, respectively. Sizes of crystal grains, confirmed through FIGS. 4 to 6, are 1740 nm, 251 nm, and 259 nm, respectively. Thus, the comparison between C-G and F-G reflects the difference according to the size of a crystal grain, and the comparison between F-G and F-G-Ba refers to the comparison result when a composition varies under the conditions of the same crystal grain size.

Figure 7:
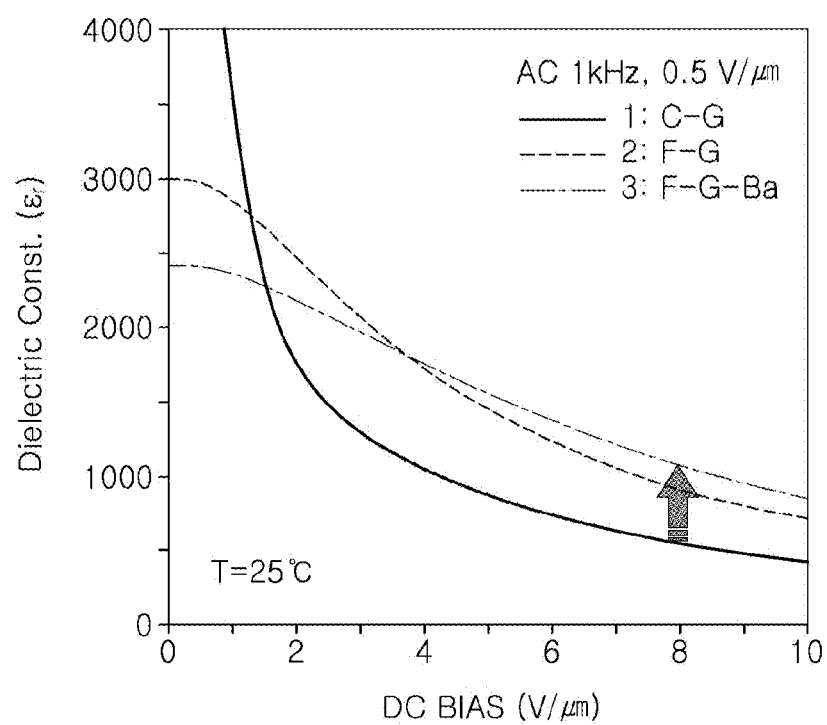
FIG. 7 is a view illustrating a dielectric constant according to a dc-bias field of a prototype sample according to an embodiment.

FIG. 7 illustrates a dielectric constant of C-G, F-G, and F-G-Ba according to a dc-bias field at room temperature. As the size of a crystal grain is decreased from C-G to F-G, a dielectric constant at a dc high electric field of 8 V/m or more is increased. Moreover, when F-G and F-G-Ba are compared with each other under the conditions of the same crystal grain size, a dc high electric dielectric constant is increased according to a composition of a dielectric. This result indicates that a composition of a dielectric may be changed to control a high electric dc-bias dielectric constant.

Figure 8:
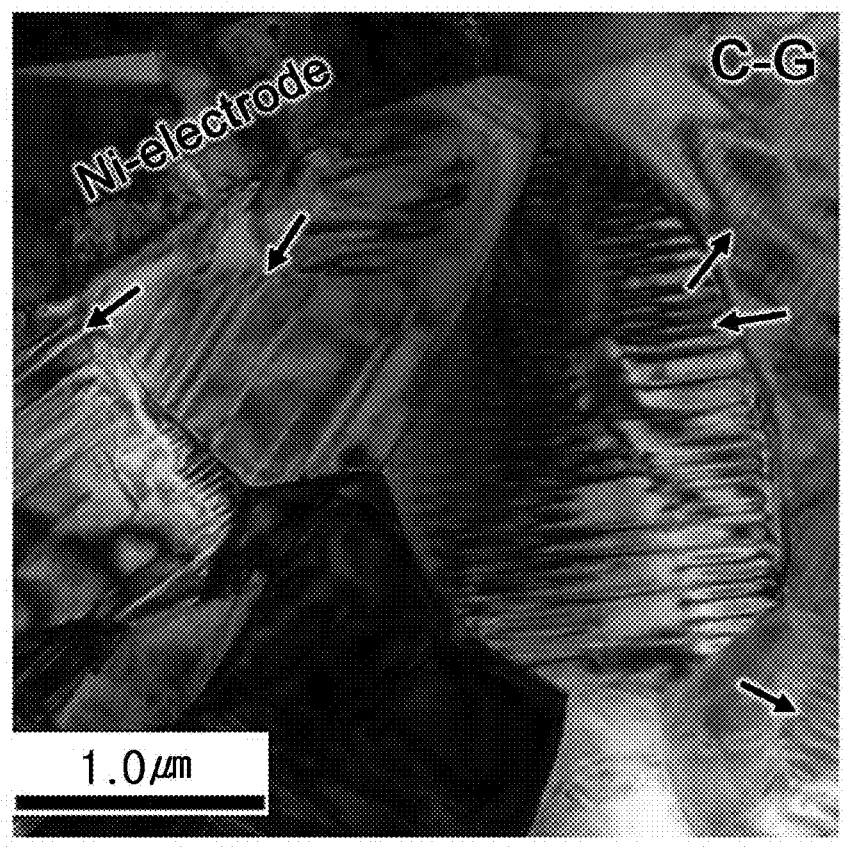
FIGS. 8 to 10 are images of a transmission electron microscope (TEM) bright field of a prototype sample according to an embodiment.
Figure 9:
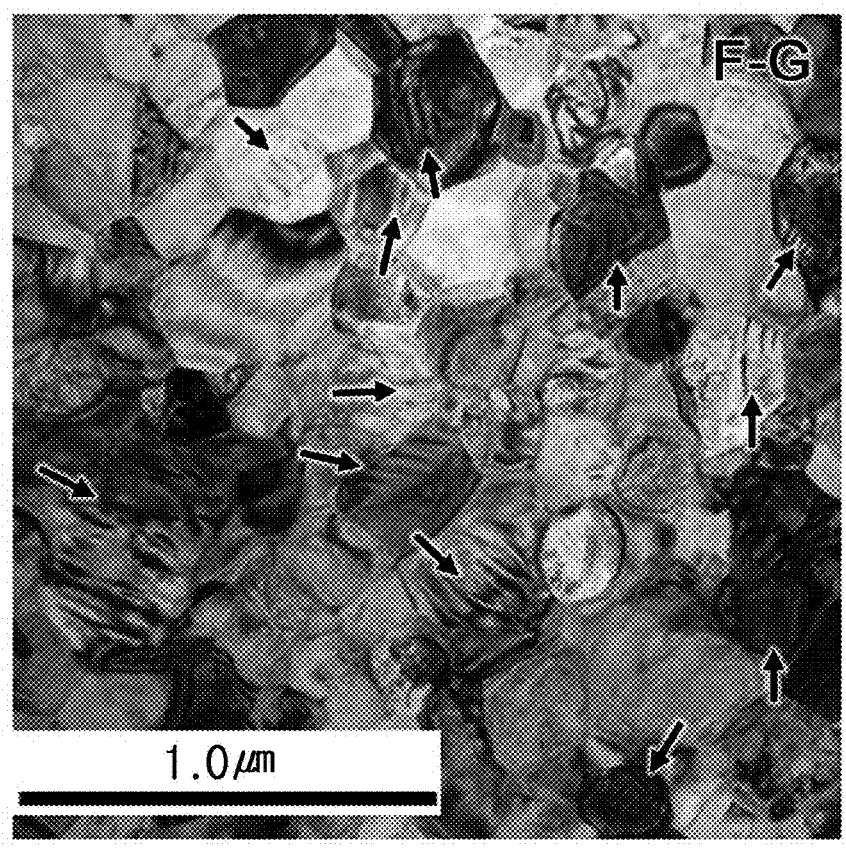
Figure 10:
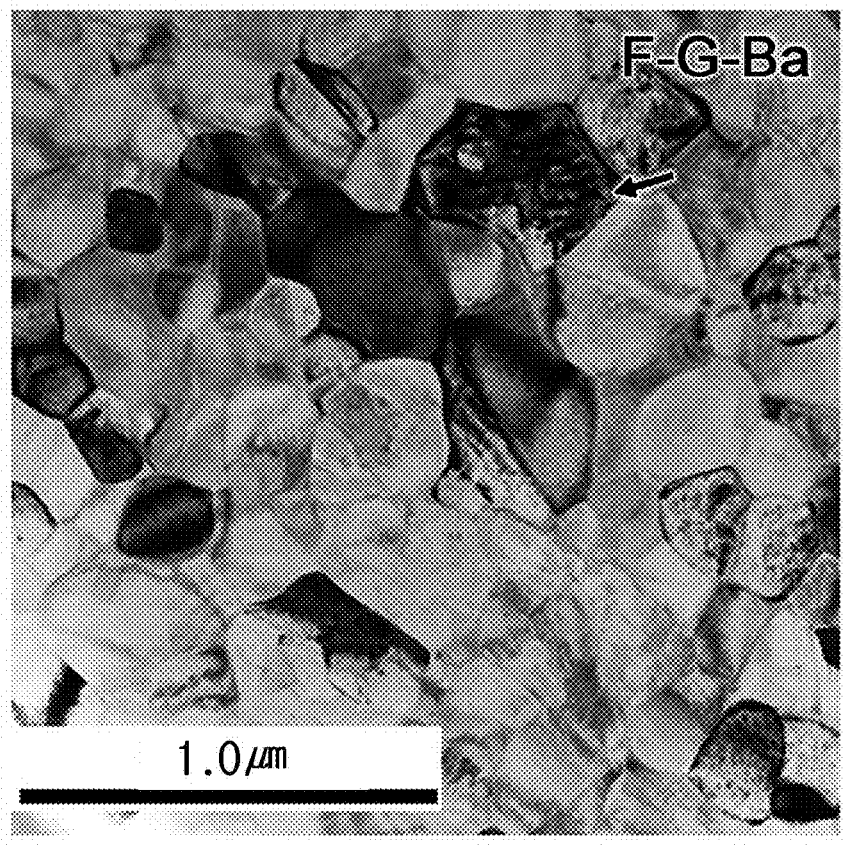

FIGS. 8 to 10 are transmission electron microscope (TEM) bright field images of C-G, F-G, and F-G-Ba, respectively. As indicated by the arrows in C-G, a large number of linear stripe patterns, corresponding to a ferroelectric 90 degree domain, were well developed. As indicated by the arrows in F-G, domains having linear stripe patterns are confirmed in a large number of fine crystal grains. In comparison, in F-G-Ba, the stripe patterns, corresponding to the ferroelectric domain, could be barely observed. Therefore, a domain boundary is a factor affecting a high electric dc-bias dielectric constant through the results described in FIGS. 7 to 10, and a ratio of a crystal grain in which a domain boundary is provided in a dielectric is reduced so as to increase a high electric dc-bias dielectric constant.

Figure 11:
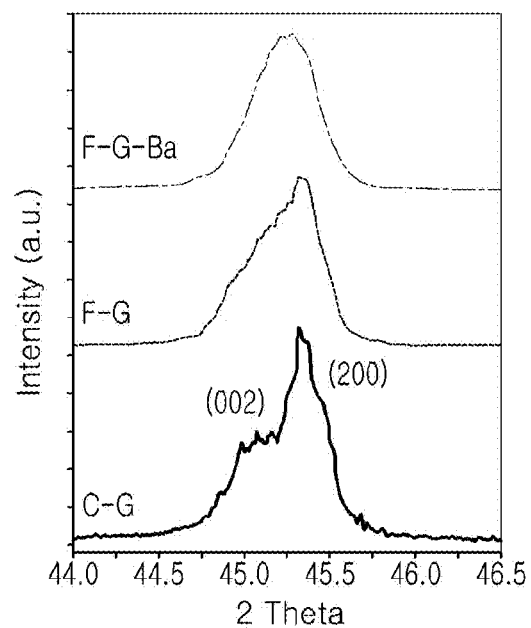
FIG. 11 illustrates an X-ray diffraction (XRD) analysis result of a prototype sample according to an embodiment.
Figure 12:
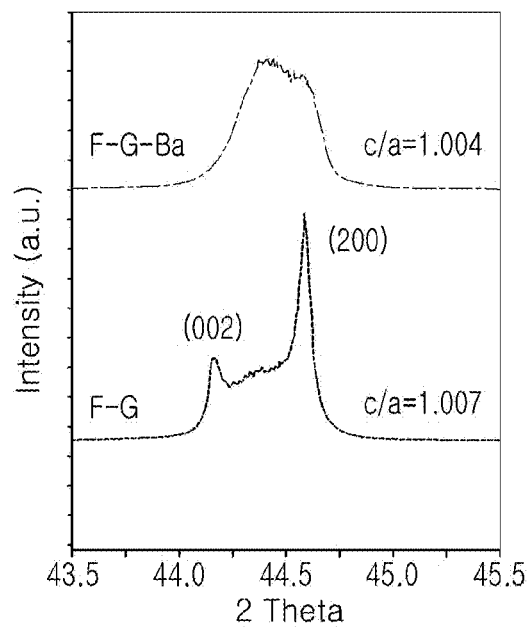
FIG. 12 illustrates a synchrotron XRD analysis result of a prototype sample according to an embodiment.

FIGS. 11 and 12 illustrate the general X-ray diffraction (XRD) and the synchrotron XRD patterns corresponding to a $BaTiO_3$ (002) plane and a (200) plane in a sample in the form of powder by pulverizing each of C-G, F-G, and F-G-Ba. In a graph of the general XRD peak, a size of the tetragonality (=c/a) is in the order of C-G>F-G>F-G-Ba. Here, a clear peak separation of the (002) plane and the (200) plane is illustrated in C-G. However, two peaks are partially overlapped in F-G, and two peaks are completely overlapped in F-G-Ba. Thus, a substantially cubical structure is provided in F-G-Ba.

The tetragonality of F-G and F-G-Ba is more clearly confirmed using the synchrotron XRD pattern as illustrated in FIG. 12. It is confirmed that the tetragonality of C-G, F-G, and F-G-Ba are 1.009, 1.007, and 1.004, respectively, through the synchrotron XRD pattern. Thus, it is confirmed that high electric dc-bias characteristics are excellent, when the tetragonality of a dielectric after sintering is less than 1.007.

A dielectric ceramic composition according to another embodiment includes a barium titanate base material main component and a subcomponent, and the subcomponent may include at least one or more among first to sixth subcomponents.

Hereinafter, each component of a dielectric ceramic composition according to an embodiment will be described more specifically.

a) Base Material Main Component

A dielectric ceramic composition according to an embodiment may include a barium titanate base material main component.

In an example, a barium titanate base material main component, applied to an embodiment, may be indicated by $ABO_3$ (A is at least one selected from the group consisting of barium (Ba), strontium (Sr), and calcium (Ca), and B is at least one of titanium (Ti) or zirconium (Zr)). For example, the $ABO_3$ may be a compound in which Ba, Sr, or Zr is partially dissolved in $BaTiO_3$. Ratios of each element of A and B included as $ABO_3$ vary depending on the combinations of the selected elements of A and B. The $ABO_3$ may be indicated by $(Ba_{1-x}Ca_x)(Ti_{1-y}Ca_y)O_3$, $(Ba_{1-x-z}Ca_xSr_z)(Ti_{1-y}Ca_y)O_3$, or the like. Here, in the composition formula, x may be a number from 0 to 0.2, inclusive, y may be a number from 0 to 0.1, inclusive, and z may be a number from 0 to 0.1, inclusive, but it is not limited thereto. For example, when x is 0, y is 0, and z is 0 in the composition formula, the $ABO_3$ may be $BaTiO_3$.

The base material main component may be included in the form of powder, and an average particle diameter of powder of the base material main component is not particularly limited, but may be 1000 nm or less, by way of example.

b) First Subcomponent

According to an embodiment, the dielectric ceramic composition may include one or more elements selected from the group consisting of a variable-valence acceptor element including one or more of manganese (Mn), vanadium (V), chromium (Cr), iron (Fe), nickel (Ni), cobalt (Co), copper (Cu), and zinc (Zn), an oxide thereof, and a carbonate thereof, as a first subcomponent. The oxide of the first subcomponent may include manganese oxide ($MnO_2$), vanadium oxide (vanadium (II) oxide (VO), vanadium (III) oxide ($V_2O_3$), vanadium(IV) oxide ($VO_2$), vanadium(V) oxide ($V_2O_5$)), chromium oxide (chromium(II) oxide (CrO), chromium(III) oxide ($Cr_2O_3$), chromium (IV) oxide ($CrO_2$), chromium(VI) oxide ($CrO_3$)), iron oxide (iron (II) oxide (FeO), iron (II, III) oxide ($Fe_3O_4$), iron (III) oxide ($Fe_2O_3$)), nickel oxide (nickel (II) oxide (NiO), nickel (III) oxide ($Ni_2O_3$)), cobalt oxide (cobalt (II) oxide (CoO), cobalt (II, III) oxide ($Co_3O_4$), cobalt (III) oxide ($Co_2O_3$)), copper oxide (CuO), or zinc oxide (ZnO). The carbonate of the first subcomponent may include manganese carbonate ($MnCO_3$), vanadium carbonate (vanadium(IV) carbonate ($V(CO_3)_2$), vanadium(V) carbonate ($V_2(CO_3)_5$)), chromium carbonate (chromium(II) carbonate ($CrCO_3$), chromium (III) carbonate ($Cr_2(CO_3)_3$)), iron carbonate (iron (II) carbonate ($FeCO_3$), iron (III) carbonate ($Fe_2(CO_3)_2$)), nickel carbonate ($NiCO_3$), cobalt carbonate ($CoCO_3$), copper carbonate ($CuCO_3$), or zinc carbonate ($ZnCO_3$).

The first subcomponent may be included in a range of 0.1 mol % to 1.0 mol %, inclusive, with respect to the base material main component. In this specification, the expression "a certain component is 'included in x mol %' with respect to a base material main component" means that the component is included in x mol parts with respect to 100 moles of the base material main component.

The content (e.g., mol % and mol parts) of the first subcomponent may be the content of the elements Mn, V, Cr, Fe, Ni, Co, Cu, and Zn, included in the dielectric ceramic composition as the first subcomponent with respect to 100 mol parts of the base material main component, without regard to additional forms such as oxides or carbonates of elements of Mn, V, Cr, Fe, Ni, Co, Cu, and Zn.

For example, the sum of the content of the first subcomponent including at least one or more variable-valence acceptor elements selected from the group consisting of Mn, V, Cr, Fe, Ni, Co, Cu, and Zn, included in the dielectric ceramic composition as the first subcomponent, may be 0.1 to 1.0 mol parts, inclusive, with respect to 100 mol parts of the base material main component.

The first subcomponent serves to improve non-reductive properties of a dielectric ceramic composition and improve high-temperature withstand voltage characteristics of a multilayer ceramic electronic component to which a dielectric ceramic composition is applied.

c) Second Subcomponent

According to an embodiment, the dielectric ceramic composition may include one or more elements of a fixed-valence acceptor element including magnesium (Mg), an oxide thereof, and a carbonate thereof, as a second subcomponent. The oxide of the second subcomponent includes magnesium oxide (MgO). The carbonate of the second subcomponent includes magnesium carbonate ($MgCO_3$).

The second subcomponent may be included in a range of 2.0 mol % or less, inclusive, with respect to the base material main component.

The content (e.g., mol % and mol parts) of the second subcomponent may be the content of Mg, included in the dielectric ceramic composition as the second subcomponent with respect to 100 mol parts of the base material main component, without regard to addition forms such as an oxide or a carbonate of Mg.

For example, the content of a Mg element included in the dielectric ceramic composition as the second subcomponent may be 2.0 mol parts or less with respect to 100 mol parts of the base material main component.

If the content of the second subcomponent exceeds 2.0 mol parts with respect to 100 mol parts of the dielectric base material main component, a dielectric constant is lowered and high-temperature withstand voltage characteristics are lowered, which is not preferable.

d) Third Subcomponent

According to an embodiment, the dielectric ceramic composition may include a third subcomponent including one or more elements selected from the group consisting of yttrium (Y), dysprosium (Dy), holmium (Ho), erbium (Er), Gadolinium (Gd), cerium (Ce), neodymium (Nd), samarium (Sm), terbium (Tb), thulium (Tm), lanthanum (La), and ytterbium (Yb), oxides thereof, and carbonates thereof. The oxides of the third subcomponent includes yttrium oxide (yttrium(III) oxide ($Y_2O_3$)), dysprosium oxide (dysprosium (III) oxide ($Dy_2O_3$)), holmium oxide (holmium(III) oxide ($Ho_2O_3$)), erbium oxide (erbium(III) oxide $Er_2O_3$)), gadolinium oxide (gadolinium(III) oxide ($Gd_2O_3$)), cerium oxide (cerium(IV) oxide ($CeO_2$)), neodymium oxide (neodymium (III) oxide ($Nd_2O_3$)), samarium oxide (samarium(III) oxide ($Sm_2O_3$)), terbium oxide (terbium(III) oxide ($Tb_2O_3$), terbium(III, IV) oxide ($Tb_4O_7$)), thulium oxide (thulium(III) oxide ($Tm_2O_3$)), lanthanum oxide ($La_2O_3$), ytterbium oxide (ytterbium(III) oxide ($Yb_2O_3$)). The carbonates of the third subcomponent includes yttrium carbonate (yttrium(III) carbonate ($Y_2(CO_3)_3$)), dysprosium carbonate (dysprosium(III) carbonate ($Dy_2(CO_3)_3$)), holmium carbonate (holmium(III) carbonate ($Ho_2(CO_3)_3$)), erbium carbonate (erbium(III) carbonate ($Er_2(CO_3)_3$)), gadolinium carbonates (gadolinium (III) carbonate ($Gd_2(CO_3)_3$)), cerium carbonate (cerium(III) carbonate ($Ce_2(CO_3)_3$)), neodymium carbonates (neodymium(III) carbonate ($Nd_2(CO_3)_3$)), samarium carbonates (samarium(III) carbonate ($Sm_2(CO_3)_3$)), terbium carbonates (terbium(III) carbonate ($Tb_2(CO_3)_3$)), thulium carbonate (thulium carbonate ($Tm_2(CO_3)_3$)), lanthanum carbonate ($La_2(CO_3)_3$), or ytterbium carbonate (ytterbium(III) carbonate ($Yb_2(CO_3)_3$))

The third subcomponent may be included in a range of 0.3 mol % to 5.4 mol %, inclusive, with respect to the base material main component.

The content (e.g., mol % and mol parts) of the third subcomponent may be the content of the elements of Y, Dy, Ho, Er, Gd, Ce, Nd, Sm, Tb, Tm, La, Gd, and Yb, included in the dielectric ceramic composition as the third subcomponent with respect to 100 mol parts of the base material main component, without regard to addition forms such as oxides or a carbonates of Y, Dy, Ho, Er, Gd, Ce, Nd, Sm, Tb, Tm, La, Gd, and Yb.

For example, the sum of the content of the third subcomponent including at least one or more elements selected from the group consisting of Y, Dy, Ho, Er, Gd, Ce, Nd, Sm, Tb, Tm, La, Gd, and Yb, included in the dielectric ceramic composition as the third subcomponent, may be 0.3 to 5.4 mol parts, inclusive, with respect to 100 mol parts of the base material main component.

The third subcomponent serves to prevent reliability of a multilayer ceramic electronic component, to which a dielectric ceramic composition is applied, from being reduced, in an embodiment. If the third subcomponent is out of the above described range, high-temperature withstand voltage characteristics may be reduced.

e) Fourth Subcomponent

According to an embodiment, the dielectric ceramic composition may include a fourth subcomponent including one or more elements selected from the group consisting of barium (Ba) and calcium (Ca), oxides thereof, and carbonates thereof. The oxides of the fourth subcomponent includes barium oxide (BaO) or calcium oxide (CaO). The carbonates of the fourth subcomponent include barium carbonate ($BaCO_3$) or calcium carbonate ($CaCO_3$).

The fourth subcomponent may be included in a range of 5 mol % or less with respect to the base material main component. A lower limit of the fourth subcomponent may exceed 0 mol %, by way of example.

The content (e.g., mol % and mol parts) of the fourth subcomponent may be the content of the elements of Ba and Ca included in the dielectric ceramic composition as the fourth subcomponent with respect to 100 mol parts of the base material main component, without regard to an addition form such as oxides or carbonates of Ba and Ca.

For example, the sum of the content of at least one or more elements between Ba and Ca, included in the dielectric ceramic composition as the fourth subcomponent, may be 5.0 mol parts or less with respect to 100 mol parts of the base material main component.

The fourth subcomponent is included in 5.0 mol parts or less with respect to 100 mol parts of the base material main component, so a crystal structure of a dielectric ceramic composition according to an embodiment may be controlled.

f) Fifth Subcomponent

According to an embodiment, the dielectric ceramic composition may include a fifth subcomponent including one or more elements selected from the group consisting of oxides of an silicon (Si) element, carbonates of the Si element, and glass containing the Si element.

The fifth subcomponent may be included in a range of 0.5 mol % to 5.0 mol %, inclusive, with respect to the base material main component.

The content (mol % or mol parts) of the fifth subcomponent may be the content of Si included in the dielectric ceramic composition as the fifth subcomponent with respect to 100 mol parts of the base material main component, without regard to additional forms such as glass, oxides, or carbonates of Si.

If the content of the fifth subcomponent is less than 0.5 mol parts with respect to 100 mol parts of the dielectric base material main component, the dielectric constant and high-temperature withstand voltage may be reduced. On the other hand, if the content of the fifth subcomponent exceeds 5.0 mol parts, there may be problems such as reduction in sinterability and compactness, generation of a secondary phase, and the like. Thus, it is not preferable.

g) Sixth Subcomponent

According to an embodiment, the dielectric ceramic composition may include a sixth subcomponent including one or more elements selected from the group consisting of sodium (Na) and lithium (Li), oxides thereof, and carbonates thereof. The oxides of the sixth subcomponent include sodium oxide ($Na_2O$) or lithium oxide ($Li_2O$). The carbonates of the sixth subcomponent include sodium carbonate ($Na_2CO_3$), lithium carbonate ($Li_2CO_3$)

The sixth subcomponent may be included in 1.0 mol % or less with respect to the base material main component. A lower limit of the content of the sixth subcomponent may exceed 0 mol %, by way of example.

The content (e.g., mol % and mol parts) of the sixth subcomponent may be the content of the elements of Na and Li included in the dielectric ceramic composition as the sixth subcomponent with respect to 100 mol parts of the base material main component, without regard to additional forms such as glass, oxides, or carbonates of Na and Li.

The sixth subcomponent may be included as a sintering aid, and may serve to lower a sintering temperature.

In an example, the dielectric ceramic composition according to an embodiment includes the third subcomponent, the fourth subcomponent, and the fifth subcomponent, described previously. When an X-axis refers to the content (atomic percent (at %)) of the fifth subcomponent with respect to a total number of X, and a Y-axis refers to the total content (at %) of the third subcomponent and the fourth subcomponent with respect to a total number of X, the content relationship between the contents of the third, fourth, and fifth subcomponents may be on the boundaries of a quadrangle connecting points A (0.5, 1.9), B (0.5, 3.1), C (5, 5.4), and D (5, 3.275) and/or inside the quadrangle.

Figure 13:
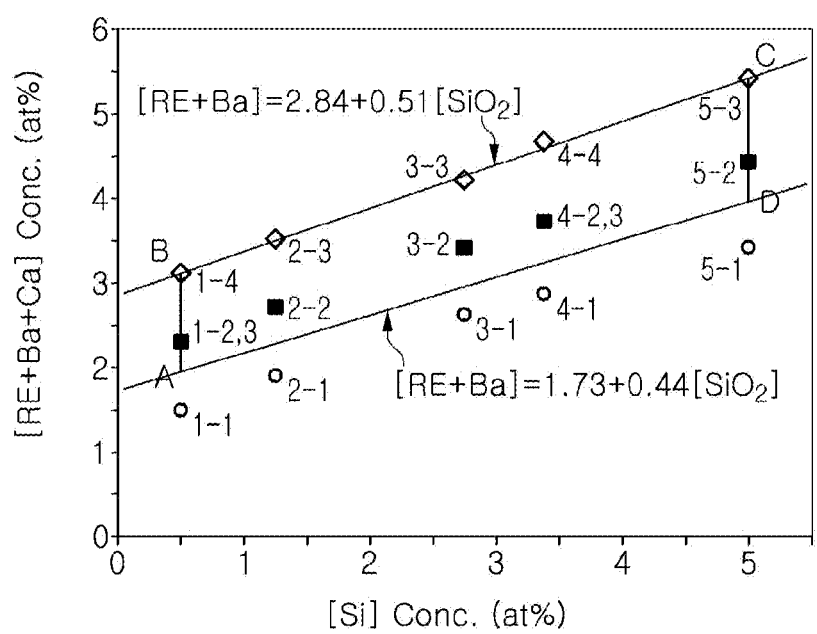
FIG. 13 is a graph illustrating the contents of third, fourth, and fifth subcomponents of an experimental example according to an embodiment.

The expression "the relationship between the contents (at %) of the third, fourth, and fifth subcomponents is on and inside boundaries of a quadrangle connecting points A (0.5, 1.9), B (0.5, 3.1), C (5, 5.4), and D (5, 3.275)" means that the relationship between the contents of the element (at %) falls inside a region surrounded by the A, B, C, and D, and on their lines connecting A and B, B and C, C and D, D and A, for example, as illustrated in FIG. 13.

FIG. 13 is a view illustrating the boundary of a quadrangle connecting the points A, B, C, and D and the interior of the quadrangle. The boundary of a quadrangle, connecting the points A, B, C, and D, and the interior of the quadrangle will be confirmed through an embodiment which will be described later.

The present disclosure is also related to a multilayer ceramic electronic component.

Figure 2:
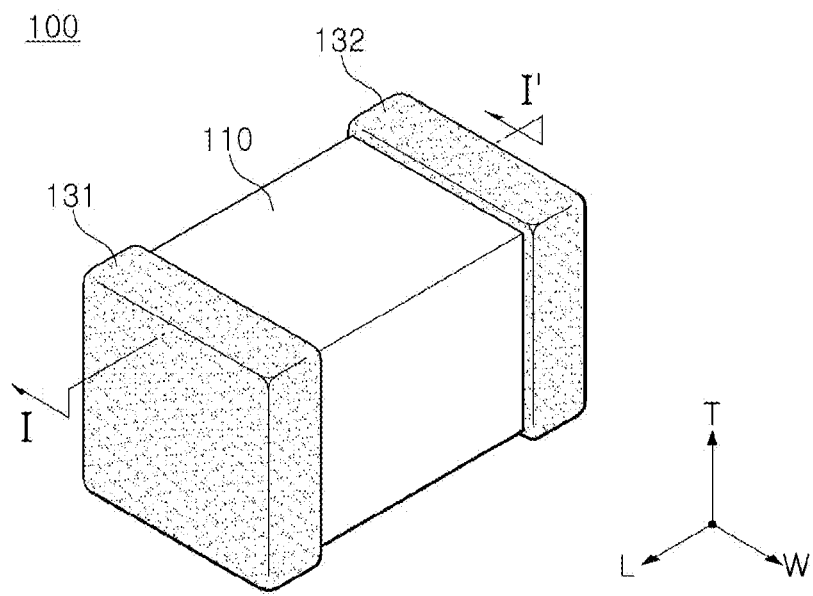
FIG. 2 is a schematic perspective view illustrating a multilayer ceramic capacitor according to an embodiment.
Figure 3:
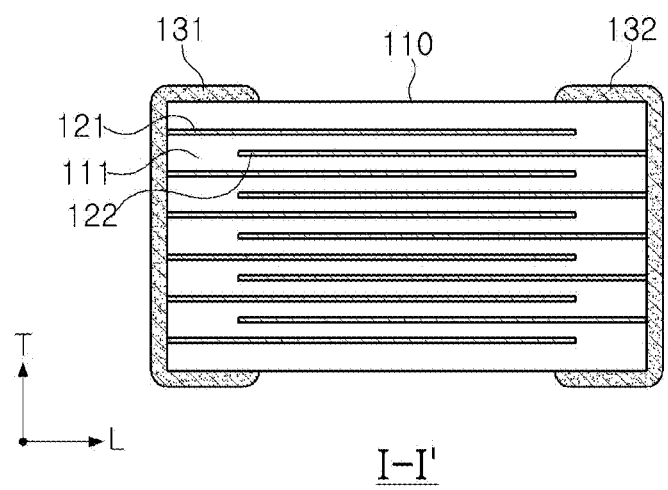
FIG. 3 is a cross-sectional view taken along line I-I' of FIG. 2.

FIG. 2 is a schematic perspective view illustrating a multilayer ceramic electronic component according to another embodiment. FIG. 3 is a schematic cross-sectional view illustrating a multilayer ceramic electronic component taken along line I-I' of FIG. 2.

Referring to FIGS. 2 and 3, a multilayer ceramic electronic component 100 according to another embodiment includes a ceramic body 110, in which a dielectric layer 111 and internal electrodes 121 and 122 are alternately stacked. On both ends of the ceramic body 110, a first external electrode 131 and a second external electrode 132, connected to a first internal electrode 121 and a second internal electrode 122, respectively, alternately disposed inside the ceramic body 110, may be provided.

A form of the ceramic body 110 is not particularly limited, but the ceramic body may have a hexahedral form in general. Alternatively, the dimension of the ceramic body is not particularly limited, and may be an appropriate dimension depending on the application. For example, the dimension may be (0.6 mm to 5.6 mm)*(0.3 mm to 5.0 mm)*(0.3 mm to 1.9 mm).

A thickness of the dielectric layer 111 may be arbitrarily changed according to the capacity design of the electronic component. In an embodiment, a thickness of a dielectric layer after sintering may be 1 µm or less per layer. A thickness of the dielectric layer 111 may be 1 µm or less, 0.9 µm or less, 0.8 µm or less, or 0.7 µm or less, but is not limited thereto. In the case of a dielectric layer having a significantly reduced thickness, since the number of crystal grains, provided in a single layer, is small, the reliability may be adversely affected. In this regard, a thickness of the dielectric layer may be equal to 0.1 µm or more.

The first internal electrode 121 and the second internal electrode 122 may be stacked to allow each cross section to be exposed to both ends of the ceramic body 110, opposing each other.

The first external electrode 131 and the second external electrode 132 are formed on both ends of the ceramic body 110, and electrically connected to exposed sections of the first internal electrode 121 and the second internal electrode 122, respectively, to form an electronic circuit.

A conductive material, included in the first internal electrode 121 and the second internal electrode 122, is not particularly limited, but may preferably be nickel (Ni).

Thicknesses of the first internal electrode 121 and the second internal electrode 122 may be appropriately determined depending on the application, and the like, and are not particularly limited, but may be 0.1 µm to 5 µm or 0.1 µm to 2.5 µm, by way of example.

A conductive material, included in the first external electrode 131 and the second external electrode 132, is not particularly limited, but may be nickel (Ni), copper (Cu), or alloys thereof.

The dielectric layer 111, forming the ceramic body 110, may include a dielectric ceramic composition according to an embodiment.

The dielectric layer 111, forming the ceramic body 110, may be formed by sintering a dielectric ceramic composition according to an embodiment.

The dielectric ceramic composition includes a barium titanate base material main component and a subcomponent, a microstructure after sintering includes a first crystal grain including 3 or less domain boundaries and a second crystal grain including 4 or more domain boundaries, and an area ratio of the second crystal grain to the total crystal grains is 20% or less.

In another embodiment, a dielectric layer of a multilayer ceramic electronic component includes a barium titanate base material main component; a third subcomponent including one or more elements selected from the group consisting of Y, Dy, Ho, Er, Gd, Ce, Nd, Sm, Tb, Tm, La, Gd, and Yb, oxides thereof, and carbonates thereof; a fourth subcomponent including one or more elements selected from the group consisting of Ba and Ca, oxides thereof, and carbonates thereof; and a fifth subcomponent including one or more elements selected from the group consisting of oxides of an Si element, carbonates of the Si element, and glass containing the Si element. When an X-axis refers to the content (atomic percent (at %)) of the fifth subcomponent with respect to a total number of X, and a Y-axis refers to the total content (at %) of the third subcomponent and the fourth subcomponent with respect to a total number of X, the relationship between the contents (at %) of the third, fourth, and fifth subcomponents may be included in boundaries of a quadrangle connecting points A (0.5, 1.9), B (0.5, 3.1), C (5, 5.4), and D (5, 3.275) and inside the quadrangle.

In addition, the detailed description of the dielectric ceramic composition is the same as characteristics of the dielectric ceramic composition according to an embodiment described above, and thus will be omitted here. Moreover, in this specification, a multilayer ceramic electronic component is provided as a multilayer ceramic capacitor, by way of example, but it is note limited thereto.

Hereinafter, the present disclosure will be described in more detail with reference to an Experimental Example. However, the Experimental Example is provided to help the specific understanding of the present disclosure, and a range according to an embodiment of the present disclosure is not limited thereto.

Experimental Example

A main component base material is $BaTiO_3$ powder having an average particle size of 100 nm.

In the raw material powder in which a main component and a subcomponent, corresponding to a composition 1 to a composition 4 illustrated in Table 1, were included, a zirconia ball was used as a mixed/distributed media, and ethanol/toluene as well as a dispersant and a binder were mixed, ball milling was performed for 20 hours.

The prepared slurry was used to manufacture a forming sheet having a thickness of 0.8 μm to 10 μm using a forming device for manufacturing a thin layer sheet, and a nickel (Ni) internal electrode printing was performed on the forming sheet.

Upper and lower covers were prepared by stacking sheets for covering (a thickness of 10 μm to 13 μm) to 25 layers, and the printed active sheet, provided as 21 layers, was pressed and stacked to prepare a bar.

The pressed bar was cut into 3.2 mm×1.6 mm sized chips using a cutter.

After the preparation of the chip having the 3216 size was completed, the chip was precalcined and then sintered in a range of 10 minutes to 1 hour at a temperature of 1080° C. to 1120° C. at a reducing atmosphere (0.1% $H_2$/99.9% $N_2$ to 1.0% $H_2$/99.0% $N_2$, $H_2O/H_2/N_2$ atmosphere), and then reoxidation was performed for 3 hours at a nitrogen ($N_2$) atmosphere at 950° C. to perform heat treatment.

The sintered chip was passed through a termination process and electrode sintering with a copper (Cu) paste to complete an external electrode.

Thus, a 3.2 mm×1.6 mm sized MLCC chip was manufactured. Here, a thickness of a dielectric after sintering was about 0.6 μm and the layer number of dielectrics is 20.

Regarding room temperature capacitance and dielectric loss of the MLCC chip, the capacity was measured under the conditions of 1 kHz and AC 0.5 V/μm using an LCR meter.

From the capacitance, a dielectric thickness of the MLCC chip, an internal electrode area, and the stacking number, a dielectric constant of the MLCC chip dielectric was calculated.

10 samples were taken, and DC 10 V/μm was applied for 60 seconds, and then the room temperature insulation resistance was measured.

A change in capacitance depending on a temperature was measured in a temperature range between −55° C. and 145° C.

Regarding a high temperature IR pressure boosting experiment, while a voltage step was increased by 5 V/μm at 150° C., a resistance deterioration behavior was measured. Here, the time for each step was 1 hour, and a resistance value was measured at intervals of 5 seconds. A high-temperature withstand voltage was derived from a high temperature IR pressure boosting experiment. In this regard, when a voltage step, dc 5 V/μm, was applied for 1 hour at 150° C. at a chip having the 3216 size and in which a dielectric, provided as 20 layers, has a thickness of 0.6 μm after sintering, and it was measured while the voltage step was continuously increased, the high-temperature withstand voltage refers to a voltage withstanding IR of 106Ω or more.

Table 2 illustrates characteristics of a Proto-type chip, corresponding to an embodiment illustrated in Table 1. A domain image in a dielectric crystal grain was observed with a transmission electron microscopy (TEM) image. As indicated by the arrows in FIGS. 8 to 10, a domain boundary could be confirmed on the TEM image. Moreover, a crystal grain in which 3 or less domain boundaries are provided in a single crystal grain was referred to as a first crystal grain, and a crystal grain in which 4 or more domain boundaries are provided therein was referred to as a second crystal grain. Here, an area ratio of the second crystal grain was calculated in a dielectric layer, composed of the first crystal grain and the second crystal grain.

TABLE 1

| | Each Additive Mole Number Per Base Material Batio3 100 Mole | | | | | | | | | |
|---|---|---|---|---|---|---|---|---|---|---|
| | First Subcomponent | Second Subcomponent | Third Subcomponent | Fourth Subcomponent | | Fifth Subcomponent | Sixth Subcomponent | | | |
| Experimental Example | $MnO_2$ | $V_2O_5$ | $MgCO_3$ | $Dy_2O_3$ | $BaCO_3$ | $CaCO_3$ | $SiO_2$ | Na | Li | Ba, Ca + RE |
| 1-1 | 0.100 | 0.100 | 0.00 | 0.15 | 1.20 | 0.00 | 0.50 | 0.20 | 0.20 | 1.50 |
| 1-2 | 0.100 | 0.100 | 0.00 | 0.15 | 2.00 | 0.00 | 0.50 | 0.20 | 0.20 | 2.30 |
| 1-3 | 0.100 | 0.100 | 0.00 | 0.15 | 0.00 | 2.00 | 0.50 | 0.20 | 0.20 | 2.30 |
| 1-4 | 0.100 | 0.100 | 0.00 | 0.15 | 2.80 | 0.00 | 0.50 | 0.20 | 0.20 | 3.10 |
| 2-1 | 0.100 | 0.100 | 0.20 | 0.15 | 1.60 | 0.00 | 1.25 | 0.50 | 0.50 | 1.90 |
| 2-2 | 0.100 | 0.100 | 0.20 | 0.15 | 2.40 | 0.00 | 1.25 | 0.50 | 0.50 | 2.70 |
| 2-3 | 0.100 | 0.100 | 0.20 | 0.15 | 3.20 | 0.00 | 1.25 | 0.50 | 0.50 | 3.50 |
| 3-1 | 0.100 | 0.100 | 0.20 | 0.70 | 1.20 | 0.00 | 2.75 | 0.20 | 0.20 | 2.60 |
| 3-2 | 0.100 | 0.100 | 0.20 | 0.70 | 2.00 | 0.00 | 2.75 | 0.20 | 0.20 | 3.40 |
| 3-3 | 0.100 | 0.100 | 0.20 | 0.70 | 2.80 | 0.00 | 2.75 | 0.20 | 0.20 | 4.20 |
| 4-1 | 0.100 | 0.100 | 2.00 | 0.50 | 1.85 | 0.00 | 3.38 | 0.00 | 0.00 | 2.85 |
| 4-2 | 0.100 | 0.100 | 2.00 | 0.50 | 2.70 | 0.00 | 3.38 | 0.00 | 0.00 | 3.70 |
| 4-3 | 0.100 | 0.100 | 2.00 | 0.50 | 0.00 | 2.70 | 3.38 | 0.00 | 0.00 | 3.70 |
| 4-4 | 0.100 | 0.100 | 2.00 | 0.50 | 3.65 | 0.00 | 3.38 | 0.00 | 0.00 | 4.65 |
| 5-1 | 0.500 | 0.250 | 1.00 | 0.50 | 2.40 | 0.00 | 5.00 | 0.00 | 0.00 | 3.40 |
| 5-2 | 0.500 | 0.250 | 1.00 | 0.50 | 3.40 | 0.00 | 5.00 | 0.00 | 0.00 | 4.40 |
| 5-3 | 0.500 | 0.250 | 1.00 | 0.50 | 4.40 | 0.00 | 5.00 | 0.00 | 0.00 | 5.40 |

TABLE 2

| Experimental Example | Proto-type Chip Characteristics ||||||  Characteristics |
|---|---|---|---|---|---|---|---|
| | Domain Including Second Grain Area Ratio | Dielectric Constant | DF (%) | TCC(%) (85° C.) | high electric dielectric constant @ dc8V/mm | High Temperature 150° C. Withstand Voltage (V/mm)* | Evaluation ○: Good X: Bad Δ: Normal |
| 1-1 | 75% | 3852 | 6.42 | −14.6% | 842 | 75 | X |
| 1-2 | 7% | 2746 | 3.45 | −10.2% | 1050 | 70 | ○ |
| 1-3 | 6% | 2688 | 3.25 | −9.9% | 1062 | 70 | ○ |
| 1-4 | 0% | 2304 | 2.63 | −9.5% | 1063 | 50 | ○ |
| 2-1 | 68% | 3636 | 7.36 | −13.8% | 853 | 70 | X |
| 2-2 | 10% | 2843 | 3.26 | −8.5% | 1092 | 75 | ○ |
| 2-3 | 3% | 2742 | 2.84 | −7.8% | 1102 | 45 | ○ |
| 3-1 | 76% | 4157 | 6.88 | −15.8% | 816 | 65 | X |
| 3-2 | 5% | 2765 | 2.97 | −11.3% | 1053 | 70 | ○ |
| 3-3 | 1% | 2663 | 2.54 | −7.5% | 1034 | 35 | ○ |
| 4-1 | 59% | 3520 | 3.61 | −13.5% | 816 | 75 | X |
| 4-2 | 7% | 2768 | 2.84 | −8.8% | 1019 | 70 | ○ |
| 4-3 | 5% | 2603 | 2.80 | −7.7% | 1020 | 70 | ○ |
| 4-4 | 1% | 2594 | 2.75 | −6.5% | 1028 | 40 | ○ |
| 5-1 | 61% | 3487 | 3.12 | −14.0% | 964 | 70 | X |
| 5-2 | 4% | 2835 | 2.54 | −11.2% | 1058 | 65 | ○ |
| 5-3 | 2% | 2506 | 2.23 | −10.4% | 1077 | 45 | ○ |

Regarding a characteristic determination in Table 2, if all conditions, in which a dc bias high electric dielectric constant @8V/μm (a dielectric constant when a dc 8 V/μm was applied) was 1000 or more, a high temperature (150° C.) withstand voltage was 40 V/μm or more, and a TCC (85° C.) was less than 13.5%, were satisfied, it was indicated by "o." On the other hand, if one condition is not satisfied, it was indicated by "X."

Referring to Tables 1 and 2, in the case of each of Experimental Examples 1-1, 2-1, 3-1, 4-1, and 5-1, in which an area ratio of the second crystal grain is high, a high electric dielectric constant was not satisfied, or a TCC (85° C.) condition was not satisfied. On the other hand, in the case of Experimental Examples, in which an area ratio of the second crystal grain was 20% or less, all characteristic determinations were satisfied. In detail, a high electric dc-bias dielectric constant was excellent.

In addition, through Experimental Examples 1-4, 2-3, 3-3, 4-4, and 5-3, a boundary value of the total content of the third subcomponent and the fourth subcomponent to the content of the fifth subcomponent, illustrated in FIG. 13, was confirmed. In the case of Experimental Examples 1-1, 2-1, 3-1, 4-1, and 5-1, characteristic determinations were not satisfied. However, in the case of Experimental Examples 1-2, 2-2, 3-2, 4-2, and 5-2, characteristic determinations were satisfied. Thus, a characteristic determination was changed at a median value of Experimental Examples 1-1, 2-1, 3-1, 4-1, and 5-1 and Experimental Examples 1-2, 2-2, 3-2, 4-2, and 5-2, and the median value of the Experimental Example was determined as a boundary value. Thus, when the content ranges of the third, fourth, and fifth subcomponents were included in the boundary of a quadrangle connecting A, B, C, and D of FIG. 13 and inside the quadrangle, a high-temperature withstand voltage and high electric dc-bias characteristics were excellent.

As set forth above, according to an embodiment in the present disclosure, a dielectric ceramic composition in which a dc bias dielectric constant and high-temperature withstand voltage characteristics are excellent, sintering is able to be performed at a reducing atmosphere, and characteristics are less than ±15% at TCC (85° C.) or TCC (125° C.), and a multilayer ceramic electronic component may be provided.

While exemplary embodiments have been shown and described above, it will be apparent to those skilled in the art that modifications and variations could be made without departing from the scope of the present invention as defined by the appended claims.

What is claimed is:

1. A dielectric ceramic composition, comprising a barium titanate base material main component and a subcomponent,
    wherein a microstructure after sintering of the dielectric ceramic composition includes a first crystal grain including 4 or more domain boundaries, and
    an area ratio of the first crystal grain to the total crystal grains is 20% or less.

2. The dielectric ceramic composition of claim 1, wherein the barium titanate base material main component includes a base material main component indicated by $ABO_3$, in which A is at least one element selected from the group consisting of barium (Ba), strontium (Sr), and calcium (Ca), and B is at least one of titanium (Ti) or zirconium (Zr), wherein ratios of each element of A and B included as $ABO_3$ vary depending on the combination of the selected elements of A and B.

3. The dielectric ceramic composition of claim 1, wherein the subcomponent includes:
    a first subcomponent including one or more variable-valence acceptor elements selected from the group consisting of manganese (Mn), vanadium (V), chromium (Cr), iron (Fe), nickel (Ni), cobalt (Co), copper (Cu), and zinc (Zn), an oxide thereof, and a carbonate thereof;
    a second subcomponent including one or more elements selected from the group consisting of a fixed-valence acceptor element including magnesium (Mg), an oxide thereof, and a carbonate thereof;
    a third subcomponent including one or more elements selected from the group consisting of yttrium (Y), dysprosium (Dy), holmium (Ho), erbium (Er), gadolinium (Gd), cerium (Ce), neodymium (Nd), samarium (Sm), terbium (Tb), thulium (Tm), lanthanum (La), gadolinium (Gd), and ytterbium (Yb), an oxide thereof, a carbonate thereof;

a fourth subcomponent including one or more elements selected from the group consisting of barium (Ba) and calcium (Ca), an oxide thereof, and a carbonate thereof;

a fifth subcomponent including one or more elements selected from the group consisting of an oxide of an Si element, a carbonate of the Si element, and glass containing the Si element; and a sixth subcomponent including one or more elements selected from the group consisting sodium (Na) and lithium (Li), an oxide thereof, a carbonate thereof.

4. The dielectric ceramic composition of claim 3, wherein the third subcomponent is included in the dielectric ceramic composition in a range of 0.3 mol % to 5.4 mol %, inclusive, with respect to the base material main component.

5. The dielectric ceramic composition of claim 3, wherein the fourth subcomponent is included in the dielectric composition in 5 mol % or less with respect to the base material main component.

6. The dielectric ceramic composition of claim 3, wherein the fifth subcomponent is included in the dielectric composition in a range of 0.5 mol % to 5 mol %, inclusive, with respect to the base material main component.

7. The dielectric ceramic composition of claim 3, wherein, with respect to the base material main component,
the first subcomponent is included in the dielectric composition in a range of 0.1 mol % to 1.0 mol %, inclusive,
the second subcomponent is included in the dielectric composition in 2 mol % or less, and
the sixth subcomponent is included in the dielectric composition in 1 mol % or less.

8. The dielectric ceramic composition of claim 1, wherein the subcomponent includes:
a third subcomponent including one or more elements selected from the group consisting of yttrium (Y), dysprosium (Dy), holmium (Ho), erbium (Er), gadolinium (Gd), cerium (Ce), neodymium (Nd), samarium (Sm), terbium (Tb), thulium (Tm), lanthanum (La), and Yb, oxides thereof, and carbonates thereof;
a fourth subcomponent including one or more elements selected from the group consisting of Ba and Ca, oxides thereof, and carbonates thereof; and
a fifth subcomponent including one or more elements selected from the group consisting of oxides of an Si element, carbonates of the Si element, and glass containing the Si element, and
a relationship between the contents (atomic percent (at %)) of the third, fourth, and fifth subcomponents is on or inside boundaries of a quadrangle connecting points A (0.5, 1.9), B (0.5, 3.1), C (5, 5.4), and D (5, 3.275), when an X-axis refers to the content (at %) of the fifth subcomponent, and a Y-axis refers to the total content (at %) of the third subcomponent and the fourth subcomponent.

9. The dielectric ceramic composition of claim 1, wherein the microstructure after sintering further includes a second crystal grain including 3 or less domain boundaries.

10. The dielectric ceramic composition of claim 1, wherein the area ratio of the first crystal grain to the total crystal grains is 10% or less.

11. The dielectric ceramic composition of claim 2, wherein the $ABO_3$ is $(Ba_{1-x}Ca_x)(Ti_{1-y}Ca_y)O_3$, or $(Ba_{1-x-z}Ca_xSr_z)(Ti_{1-y}Ca_y)O_3$ in which x is a number from 0 to 0.2, y is a number from 0 to 0.1, and z is a number from 0 to 0.1.

12. The dielectric ceramic composition of claim 2, wherein the $ABO_3$ is $BaTiO_3$.

13. A multilayer ceramic electronic component, comprising:
a ceramic body including a dielectric layer and an internal electrode; and
an external electrode formed on an external surface of the ceramic body, and electrically connected to the internal electrode,
wherein a microstructure of the dielectric layer includes a first crystal grain including 4 or more domain boundaries, and
an area ratio of the first crystal grain to the total crystal grains is 20% or less.

14. The multilayer ceramic electronic component of claim 13, wherein the dielectric layer includes:
a barium titanate base material main component;
a third subcomponent including one or more elements selected from the group consisting of yttrium (Y), dysprosium (Dy), holmium (Ho), erbium (Er), gadolinium (Gd), cerium (Ce), neodymium (Nd), samarium (Sm), terbium (Tb), thulium (Tm), lanthanum (La), and ytterbium (Yb), oxides thereof, and carbonates thereof;
a fourth subcomponent including one or more elements selected from the group consisting of barium (Ba) and calcium (Ca), oxides thereof, and carbonates thereof; and
a fifth subcomponent including one or more elements selected from the group consisting of an oxide of an Si element, a carbonate of the Si element, and glass containing the Si element, and
a relationship between the contents (atomic percent (at %)) of the third, fourth, and fifth subcomponents is on or inside boundaries of a quadrangle connecting points A (0.5, 1.9), B (0.5, 3.1), C (5, 5.4), and D (5, 3.275), when an X-axis refers to the content (at %) of the fifth subcomponent, and a Y-axis refers to the total content (at %) of the third subcomponent and the fourth subcomponent.

15. The multilayer ceramic electronic component of claim 13, wherein the internal electrode includes a first internal electrode and a second internal electrode, disposed to oppose each other with the dielectric layer interposed therebetween.

16. The multilayer ceramic electronic component of claim 13, wherein the microstructure of the dielectric layer further includes a second crystal grain including 3 or less domain boundaries.

17. The multilayer ceramic electronic component of claim 13, wherein the area ratio of the first crystal grain to the total crystal grains is 10% or less.

18. A dielectric ceramic composition, comprising:
a barium titanate base material main component;
a third subcomponent including one or more elements selected from the group consisting of yttrium (Y), dysprosium (Dy), holmium (Ho), erbium (Er), gadolinium (Gd), cerium (Ce), neodymium (Nd), samarium (Sm), terbium (Tb), thulium (Tm), lanthanum (La) and ytterbium (Yb), oxides thereof, and carbonates thereof;
a fourth subcomponent including one or more elements selected from the group consisting of barium (Ba) and calcium (Ca), oxides thereof, and carbonates thereof; and
a fifth subcomponent including one or more elements selected from the group consisting of an oxide of an Si element, a carbonate of the Si element, and glass containing the Si element, and
a relationship between the contents (atomic percent (at %)) of the third, fourth, and fifth subcomponents is on or inside boundaries of a quadrangle connecting points A (0.5, 1.9), B (0.5, 3.1), C (5, 5.4), and D (5, 3.275), when an X-axis refers to the content (at %) of the fifth subcomponent, and a Y-axis refers to the total content (at %) of the third subcomponent and the fourth subcomponent.

19. The dielectric ceramic composition of claim 18, further comprising:
 a first subcomponent including one or more variable-valence acceptor elements selected from the group consisting of manganese (Mn), vanadium (V), chromium (Cr), iron (Fe), nickel (Ni), cobalt (Co), copper (Cu), and zinc (Zn), an oxide thereof, and a carbonate thereof;
 a second subcomponent including one or more elements selected from the group consisting of a fixed-valence acceptor element including magnesium (Mg), an oxide thereof, and a carbonate thereof; and
 a sixth subcomponent including one or more elements selected from the group consisting sodium (Na) and lithium (Li), an oxide thereof, a carbonate thereof.

20. The dielectric ceramic composition of claim 18, wherein a microstructure after sintering of the dielectric ceramic composition includes a first crystal grain including 3 or less domain boundaries and a second crystal grain including 4 or more domain boundaries, and
 an area ratio of the second crystal grain to the total crystal grains is 20% or less.

\* \* \* \* \*